(12) United States Patent
Azami

(10) Patent No.: US 9,294,741 B2
(45) Date of Patent: Mar. 22, 2016

(54) IMAGING APPARATUS, IMAGING METHOD, IMAGING SYSTEM, AND PROGRAM PRODUCT

(71) Applicant: JVC KENWOOD Corporation, Yokohama-shi (KR)

(72) Inventor: Tomohiro Azami, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 13 days.

(21) Appl. No.: 13/926,584

(22) Filed: Jun. 25, 2013

(65) Prior Publication Data

US 2013/0342720 A1 Dec. 26, 2013

(30) Foreign Application Priority Data

Jun. 26, 2012 (JP) .................................. 2012-143259

(51) Int. Cl.
*H04N 9/04* (2006.01)
*H04N 5/232* (2006.01)
*H04N 7/18* (2006.01)

(52) U.S. Cl.
CPC ............. *H04N 9/04* (2013.01); *H04N 5/23216* (2013.01); *H04N 5/23296* (2013.01); *H04N 7/183* (2013.01); *H04N 5/23203* (2013.01); *H04N 5/23293* (2013.01)

(58) Field of Classification Search
USPC ........................................... 348/211.8, 211.9
See application file for complete search history.

(56) References Cited

U.S. PATENT DOCUMENTS

| 2004/0223058 A1* | 11/2004 | Richter et al. ............. 348/207.1 |
| 2006/0075448 A1 | 4/2006 | McAlpine et al. |
| 2007/0113255 A1 | 5/2007 | Kurosawa |
| 2007/0120979 A1 | 5/2007 | Zhang et al. |
| 2009/0201378 A1* | 8/2009 | Kondo ...................... 348/207.11 |
| 2010/0002071 A1* | 1/2010 | Ahiska ..................... 348/240.99 |
| 2012/0026344 A1* | 2/2012 | Ezoe et al. ................. 348/207.1 |

FOREIGN PATENT DOCUMENTS

| EP | 2 413 588 A2 | 2/2012 |
| JP | 2002-354330 A | 12/2002 |
| JP | 2004-128997 | 4/2004 |
| JP | 2007-166583 A | 6/2007 |
| JP | 2011-254345 A | 12/2011 |
| WO | WO-2010/116366 A1 | 10/2010 |

OTHER PUBLICATIONS

Extended European Search Report in European Patent Application No. 13020044.7, dated Nov. 4, 2013.

* cited by examiner

*Primary Examiner* — Jason Flohre
(74) *Attorney, Agent, or Firm* — Venable LLP; Michael A. Sartori; Todd R. Farnsworth

(57) ABSTRACT

An imaging apparatus includes: an imaging unit that generates first image data by an imaging process; a receiving unit that receives view angle change request information to instruct a change in angle of view on which an imaging process is performed, and number-of-pixels information related to the number of pixels of a display unit of an operation terminal; an image cropping unit that sets an area of part of a first image data as a crop area based on the view angle change request information and the number-of-pixels information, and crops a second image data included in the crop area; and a transmitting unit that transmits the second image data to the operation terminal.

4 Claims, 9 Drawing Sheets

IMAGING APPARATUS, IMAGING METHOD, IMAGING SYSTEM, AND PROGRAM PRODUCT

CROSS-REFERENCE TO RELATED APPLICATIONS

This application is based upon and claims the benefit of priority from Japanese Patent Application No. 2012-143259, filed on Jun. 26, 2012, the entire contents of which are incorporated herein by reference.

BACKGROUND OF THE INVENTION

1. Field of the Invention

The present invention relates to an imaging apparatus, an imaging method, an imaging system, and a program.

2. Description of the Related Art

A camcorder that can be operated using a wireless communication terminal such as a smartphone or a tablet terminal is known. Such a camcorder receives an operation signal sent from a wireless communication terminal via a wireless communication path such as Wi-Fi, and executes an operation (such as start of recording, stop of recording, pan operation, tilt operation, or zoom operation) in accordance with the operation signal.

For example, Japanese Patent Application Laid-open No. 2004-128997 discloses a video remote control method in which a remote camera is operated using a mobile terminal. The remote camera changes an imaging direction (pans or tilts) by changing the orientation of the mobile terminal. The mobile terminal then displays a captured image of the remote camera.

However, in the method described in Japanese Patent Application Laid-open No. 2004-128997, a control signal is transmitted to the remote camera by changing the orientation of the mobile terminal (instructing a change in angle of view). The remote camera that has received the control signal then executes pan/tilt operation, or the like so as to capture an image in an imaging direction in accordance with the control signal. In this manner, after a user gives the remote camera an instruction on change in angle of view by using the mobile terminal, the remote camera performs pan/tilt operation, or the like on the instruction, and transmits the captured image data to the mobile terminal. As a consequence, there is a problem that a delay occurs from when the instruction on change in angle of view is performed in the mobile terminal to when an image at the angle of view corresponding to the instruction is displayed.

The present invention has been made to solve such a problem, and an object thereof is to provide an imaging apparatus, an imaging method, an imaging system, and a program that can improve the speed of change in the angle of view of a display image.

SUMMARY OF THE INVENTION

With such a configuration, it is possible to change the angle of view of the display unit simply by changing only the crop area without changing the angle of view of the captured image data. Hence, it is possible to improve the operation speed of change in the angle of view of the display unit. It is an object of the present invention to at least partially solve the problems in the conventional technology.

According to an aspect of the present invention an imaging apparatus includes: an imaging unit that generates first image data by an imaging process; a receiving unit that receives view angle change request information to instruct a change in angle of view on which an imaging process is performed, and number-of-pixels information related to the number of pixels of a display unit of an operation terminal; an image cropping unit that sets an area of part of a first image data as a crop area based on the view angle change request information and the number-of-pixels information, and crops a second image data included in the crop area; and a transmitting unit that transmits the second image data to the operation terminal.

According to another aspect of the present invention an imaging system includes: an imaging apparatus; and an operation terminal that operates the imaging apparatus. The imaging apparatus and the operation terminal are connectable via a communication path, the imaging apparatus includes: an imaging unit that generates a first image data by an imaging process; a first receiving unit that receives view angle change request information to instruct a change in angle of view on which an imaging process is performed, and number-of-pixels information related to the number of pixels of a display unit of the operation terminal; an image cropping unit that sets an area of a part of the first image data as a crop area based on the view angle change request information and the number-of-pixels information, and crops a second image data included in the crop area; and a first transmitting unit that transmits the second image data to the operation terminal, and the operation terminal includes: an operation unit; a view angle change request information generation unit that generates the view angle change request information based on operation of the operation unit; a second receiving unit that receives the second image data; a display unit that displays the second image data thereon; and a second transmitting unit that transmits the view angle change request information and the number-of-pixels information of the display unit to the imaging apparatus.

According to still another aspect of the present invention an imaging method includes: generating a first image data by an imaging process; receiving view angle change request information to instruct a change in angle of view on which an imaging process is performed, and number-of-pixels information related to the number of pixels of a display unit of an operation terminal; setting an area of part of the first image data as a crop area based on the view angle change request information and the number-of-pixels information, and cropping a second image data included in the crop area; and transmitting the second image data to the operation terminal.

According to still another aspect of the present invention computer program product including a non-transitory computer usable medium having computer readable program causing a computer to execute: generating a first image data by an imaging process; receiving view angle change request information to instruct a change in angle of view on which an imaging process is performed, and number-of-pixels information related to the number of pixels of a display unit of an operation terminal; setting an area of part of the first image data as a crop area based on the view angle change request information and the number-of-pixels information, and cropping a second image data included in the crop area; and transmitting the second image data to the operation terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
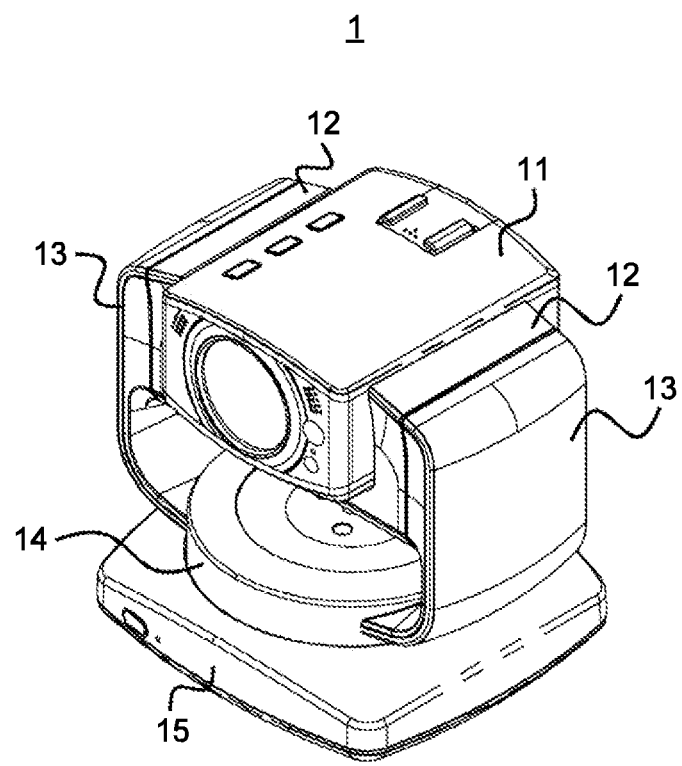
FIG. 1 is an exterior view of an imaging apparatus according to an embodiment.

A description will hereinafter will be given of an embodiment of the present invention with reference to the drawings. An imaging apparatus 1 according to the embodiment includes a digital camera that can capture a moving image and a still image. FIG. 1 illustrates an exterior perspective view of the imaging apparatus 1.

Exterior Configuration of Imaging Apparatus 1

As illustrated in FIG. 1, the imaging apparatus 1 includes a main unit 11, a support unit 12, arm units 13, a rotation platform 14, and a fixing platform 15.

The main unit 11 is a housing that houses a lens unit having a plurality of lenses, an imaging device, a battery, a Wi-Fi module, and the like. The lenses are attached to the front side of the main unit 11. The main unit 11 performs wireless communication with an operation terminal, which is described below, and operates in accordance with an instruction signal that is transmitted from the operation terminal.

The support unit 12 supports the main unit 11. Moreover, both ends of the support unit 12 in the lateral direction are rotatably coupled to the arm units 13. Hence, the support unit 12 can rotate in the direction of pitch that sets the lateral direction as an axis. One end of the arm unit 13 is coupled to the support unit 12. Moreover, the other end of the arm unit 13 is fixed to a side surface of the rotation platform 14.

The rotation platform 14 is disc shaped, and the arm units 13 are fixed at positions opposing each other on the side surface (peripheral surface) of the rotation platform 14. The rotation platform 14 is rotatably coupled to the fixing platform 15. Hence, the rotation platform 14 can rotate in the direction of yaw that sets the vertical direction as an axis. With such a configuration, the main unit 11 is supported so as to be located above the fixing platform 15, and can perform pan operation (yaw direction rotation) and tilt operation (pitch direction rotation). The pan and tilt operations are realized by driving an unillustrated motor. In other words, the support unit 12, the arm units 13, the rotation platform 14, and the fixing platform 15 function as a camera platform that is capable of pan and tilt operations.

Internal Configuration of Imaging Apparatus 1

Figure 2:
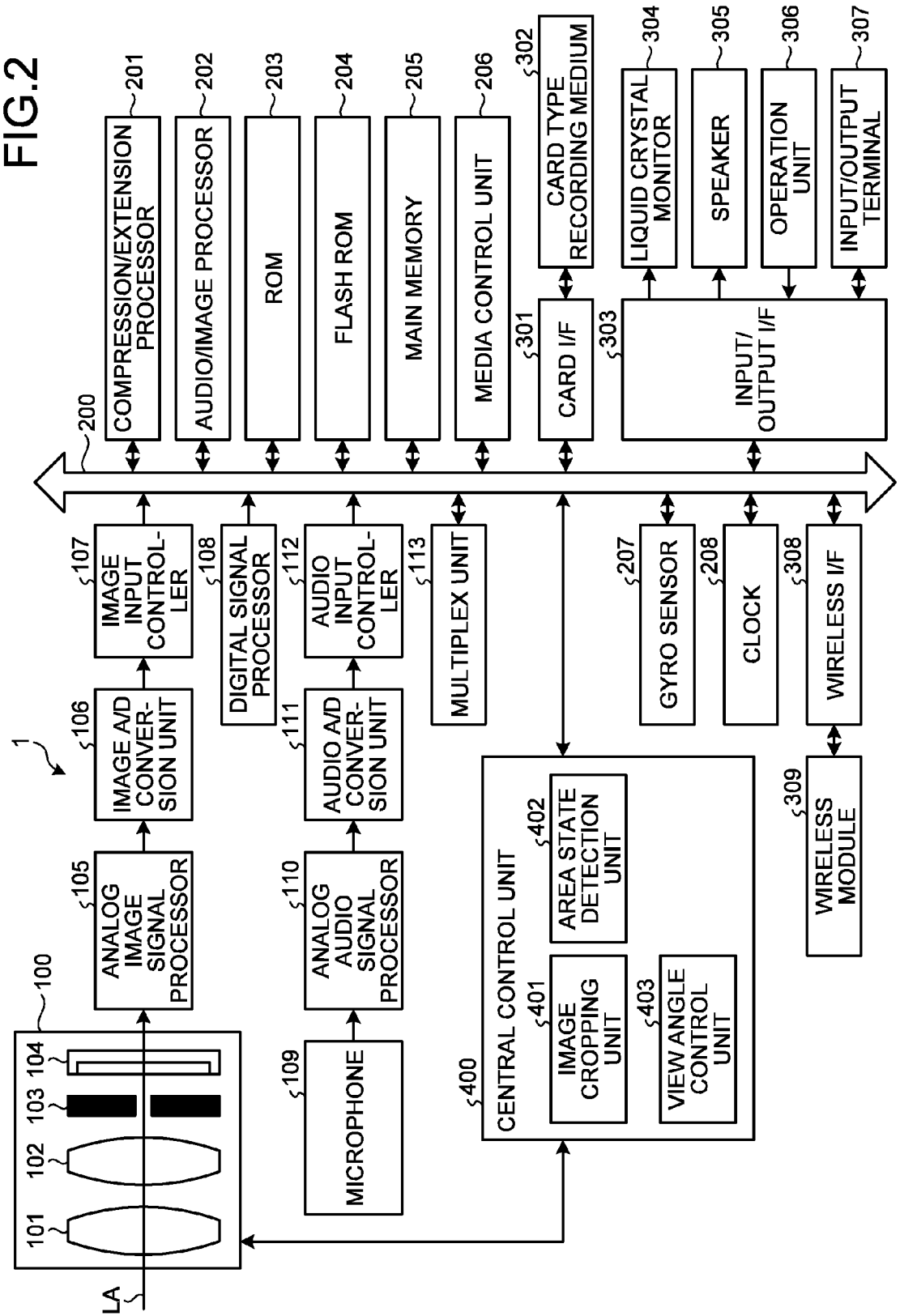
FIG. 2 is a block diagram of the imaging apparatus according to the embodiment.

A description will be given of the internal configuration of the main unit 11 of the imaging apparatus 1. FIG. 2 is a block diagram of the main unit 11 according to the embodiment. The main unit 11 includes an imaging unit 100 constituted by a zoom lens 101, a focus lens 102, a diaphragm 103, and an imaging device 104. The zoom lens 101 moves along an optical axis LA by an unillustrated zoom actuator. Similarly, the focus lens 102 moves along the optical axis LA by an unillustrated focus actuator. The diaphragm 103 is operated by being driven by an unillustrated diaphragm actuator. The imaging device 104 is constituted by a CCD (Charge Coupled Device), a CMOS (Complementary Metal Oxide Semiconductor), or the like.

Image capturing using the imaging apparatus 1 is performed in the following procedure. The imaging device 104 performs photoelectric conversion of light that has passed through the zoom lens 101, the focus lens 102, and the diaphragm 103, and generates an analog image signal of a subject. After an analog image signal processor 105 amplifies the analog image signal, an image A/D conversion unit 106 converts the amplified signal into digital image data. An image input controller 107 captures the digital image data outputted from the image A/D conversion unit 106 as imaging data, and stores the data in a main memory 205 via a bus 200.

A digital signal processor 108 (a distortion correction processing unit) captures the imaging data stored in the main memory 205 via the bus 200 based on an instruction from a central control unit 400, and performs a predetermined signal process on an RGB signal to generate data including a luminance signal and a color difference signal. The digital signal processor 108 also performs various digital corrections such as an offset process, a white balance adjustment process, a gamma correction process, an RGB complementation process, a noise reduction process, a contour correction process, a distortion correction process, a tone correction process, and a light source type determination process.

A microphone 109 collects ambient sound at the time of image capturing, and generates an analog audio signal. An analog audio signal processor 110 amplifies the analog audio signal generated by the microphone 109. An audio A/D conversion unit 111 then converts the amplified signal generated by the analog audio signal processor 110 into digital audio data. An audio input controller 112 stores in the main memory 205 the digital audio data outputted from the audio A/D conversion unit 111 together with the imaging data.

A multiplex unit 113 multiplexes compressed data of the imaging data and digital audio data that are stored in the main memory 205, and generates stream data. Moreover, the multiplex unit 113 performs an inverse multiplexing process on the stream data stored in a card type recording medium 302, and separates and generates compressed video data and compressed audio data.

A compression/extension processor 201 follows an instruction from the central control unit 400 via the bus 200, performs a predetermined compression process on the imaging data and digital audio data that are stored in the main memory 205, and generates compressed data. Moreover, the compression/extension processor 201 follows an instruction from the central control unit 400, performs an extension process in a predetermined format on the compressed video data and compressed audio data that are stored in the card type recording medium 302 or the like, and generates non-compressed data. In the imaging apparatus 1 of the embodiment, a compression format conforming to the JPEG standard is adopted for a still image, and a compression format conforming to the MPEG2 standard and the AVC/H.264 standard for a moving image are adopted.

An audio/image processor 202 follows an instruction of the central control unit 400 via the bus 200, and performs predetermined image processing on digital data read out from the main memory 205. For example, image data for various processes, such as a menu image and an OSD (On Screen Display) image, are generated, and the image data are superimposed on original imaging data read out from the main memory 205 and outputted to a liquid crystal monitor 304. The output allows an image displayed on the liquid crystal monitor 304 one that various image data are composited. Another monitor such as an organic EL (Electro-Luminescence) monitor can also be used instead of the liquid crystal monitor 304.

A ROM 203 is connected to the central control unit 400 via the bus 200, and stores a control program that is executed by the central control unit 400, various data necessary for control, and the like. A flash ROM 204 stores various setting information related to the operation of the imaging apparatus 1, such as user setting information. For example, the imaging apparatus 1 previously stores in the flash ROM 204 several image capture modes in accordance with various image capture situations, and the settings of image capture conditions that match the modes. A user can capture an image on an optimum image capture condition by selecting an optimum mode from the modes before starting image capturing. For example, there are a "portrait mode" suitable for image capturing of a specific figure, a "sport mode" suitable for image capturing of an athletic meet and the like, and a "night view mode" suitable for image capturing of a dark place such as a night view.

The main memory 205 is used as a temporary storage area of imaging data (a moving image and a still image). The main memory 205 stores in the card type recording medium 302 the holding multiplexed stream data on an instruction of the central control unit 400.

A media control unit 206 follows an instruction of the central control unit 400 and controls the writing and reading of data to and from the card type recording medium 302 through a card I/F 301. The card type recording medium 302 is an external memory such as an SD card or Compact Flash (registered trade mark), and is detachably provided to the imaging apparatus 1.

A gyro sensor 207 detects changes in three-axis acceleration and angular velocity, and detects the amount of pan, the amount of tilt, and the amount of up, down, left and right camera shake of the imaging apparatus 1. A clock 208 generates information on generation date and time of imaging data.

The liquid crystal monitor 304, a speaker 305, an operation unit 306, and an input/output terminal 307 are connected to an input/output I/F 303. The liquid crystal monitor 304 displays an image generated from various image data such as imaging data temporarily recorded in the main memory 205, and various menu image data. The speaker 305 outputs audio temporarily recorded in the main memory 205, for example. As described above, the operation unit 306 is constituted by operation keys including a release switch and a power switch, a cross key, a joy stick, a touchscreen superimposed on the liquid crystal monitor 304, or the like, and accepts the user's operation input into the imaging apparatus 1. The input/output terminal 307 is connected to the camera platform that is capable of pan operation and tilt operation (refer to FIG. 1), a TV monitor, a PC (Personal Computer), and the like.

A wireless module 309 transmits and receives a signal to and from an operation terminal via the bus 200 and a wireless I/F 308. Specifically, the wireless module 309 performs a communication process conforming to a wireless LAN standard such as Wi-Fi. Consequently, communication with the operation terminal becomes possible.

The central control unit 400 is constituted by a semiconductor integrated circuit including a CPU, a ROM where various programs are stored, and a RAM as a work area, and comprehensively controls the processes of the entire imaging apparatus 1, such as image capturing, display of various images, and transmission/reception of information related to cooperative shooting. The central control unit 400 includes an image cropping unit 401, an area state detection unit 402, and a view angle control unit 403.

The image cropping unit 401 sets, as a crop area, an area having the number of pixels in accordance with information related to the number of pixels transmitted from the operation terminal (e.g., an image size such as 1920×1080 pixels. Hereinafter referred to as the number-of-pixels information), in captured image data (first image data) generated by an imaging process. It is sufficient if the number-of-pixels information is information that can identify the number of pixels of a display unit of the operation terminal (hereinafter also referred to as an image size). Resolution may be used as the number-of-pixels information instead of the number of pixels if the size (inch) of the display unit of the operation terminal is predetermined.

The image cropping unit 401 then crops image data in the crop area. In other words, image data (second image data) included in the crop area is an area of part of the captured image data, and is image data having a smaller number of pixels than the captured image data. The image cropping unit 401 outputs the cropped image data to the wireless module 309. The wireless module 309 transmits the cropped image data to the operation terminal via a wireless communication path.

The image cropping unit 401 sets a position of the crop area in the captured image data based on information to instruct the execution of pan operation, tilt operation, zoom operation, or telescope operation that is transmitted from the operation terminal, in other words, information to instruct a change in the angle of view of the imaging unit 100 (view angle change information). In other words, the image cropping unit 401 crops, as the crop area (the second image data), an area in accordance with the view angle change information in the captured image data (the first image data).

The area state detection unit 402 (an area position detection unit, an area number-of-pixels detection unit) detects the position of the crop area in the captured image data and the number of pixels included in the crop area. The area state detection unit 402 outputs the detected position and number of pixels of the crop area to the view angle control unit 403.

The view angle control unit 403 (first and second view angle control units) generates control signals to cause the imaging apparatus 1 to execute pan operation, tilt operation, zoom operation, and telescope operation. The view angle control unit 403 controls the angle of view of the imaging unit 100 based on the position and number of pixels of the crop area that have been outputted from the area state detection unit 402. The view angle control unit 403 then outputs the generated control signal to the motor (illustration omitted) of the camera platform illustrated in FIG. 1 if a pan operation or a tilt operation is executed. Consequently, the imaging apparatus 1 mounted on the camera platform rotates in a pan direction or a tilt direction. The pan direction indicates a horizontal direction, and the tilt direction indicates a vertical direction. Moreover, in executing a zoom operation or a telescope operation, the view angle control unit 403 outputs the generated control signal to the zoom actuator of the imaging unit 100. Consequently, the zoom lens 101 of the imaging unit 100 is driven, and an optical zoom operation or a telescope operation is executed.

Configuration of Operation Terminal 20

Figure 3:
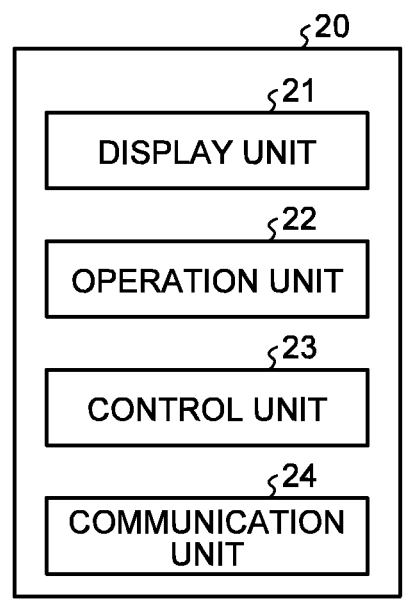
FIG. 3 is a block diagram of an operation terminal according to the embodiment.

Next, a description will be given of an operation terminal 20 for remote controlling the imaging apparatus 1. FIG. 3 is a block diagram illustrating a configuration example of the operation terminal 20 according to the embodiment. The operation terminal 20 includes a display unit 21, an operation unit 22, a control unit 23, and a communication unit 24.

The display unit 21 is, for example, an LCD (Liquid Crystal Display) or an organic EL, and displays a moving image based on frame-by-frame image data (the second image data) sent from the imaging apparatus 1. The operation unit 22 includes a pan operation button, a tilt operation button, a zoom operation button, a telescope operation button, a recording start button, recording stop button, and the like.

If the button of the operation unit 22 is pressed down, the control unit 23 generates a control signal corresponding to the pressed button. For example, if the pan operation button is pressed down, the control unit 23 generates a control signal to instruct the imaging apparatus 1 on pan operation (hereinafter referred to as a pan operation signal). Moreover, if the tilt operation button is pressed down, the control unit 23 generates a control signal to instruct the imaging apparatus 1 on tilt operation (hereinafter referred to as a tilt operation signal). The pan operation signal and the tilt operation signal are direction instruction information to instruct an imaging direction of the imaging apparatus 1, and are signals including target values of the angles of pan and tilt, the amounts of pan and tilt, and the like. Coordinate information of a crop area in captured image data may be contained in a pan operation signal and a tilt operation signal.

Similarly, if the zoom operation button is pressed down, a control signal to instruct the imaging apparatus 1 on zoom operation (hereinafter referred to as a zoom operation signal) is generated. Moreover, if the telescope operation button is pressed down, the control unit 23 generates a control signal to instruct the imaging apparatus 1 on telescope operation (hereinafter referred to as a telescope operation signal).

The operation unit 22 may be a button that can be pressed down, or a touchscreen. For example, if an operation program is downloaded to a smartphone and the smartphone is used as the operation terminal 20, the display unit 21 can also be used as the operation unit 22. In this case, the control unit 23 may be configured to generate a pan/tilt operation signal by swiping up, down, left, or right the display unit 21 with a finger of a user. For example, a pan angle and a tilt angle may be determined in accordance with the speed and amount of a swipe. Furthermore, a pan/tilt operation signal may be generated by providing a smartphone with an acceleration sensor, and tilting the smartphone terminal itself up, down, left, or right.

Moreover, the control unit 23 may be configured to generate a zoom operation signal by using the fingers of the user to pinch out on the display unit 21. Furthermore, the control unit 23 may be configured to generate a telescope operation signal by using the fingers of the user to pinch in on the display unit 21. For example, the amount of zoom and the like may be determined in accordance with the travel distance of two fingers during pinch-out operation or pinch-in operation.

The control unit 23 is constituted by a semiconductor integrated circuit including a CPU, a ROM where various programs are stored, and a RAM as a work area, and comprehensively controls the processes of the entire operation terminal 20, such as the display of various images. The control unit 23 generates a connection request signal to enable the imaging apparatus 1 and the operation terminal 20 to communicate. The control unit 23 then transmits the connection request signal to the imaging apparatus 1. When communication is established between the imaging apparatus 1 and the operation terminal 20, the control unit 23 causes the communication unit 24 to transmit the number-of-pixels information of the display unit 21. The number-of-pixels information is previously stored in an unillustrated memory or the like.

The communication unit 24 performs a wireless communication process such as Wi-Fi, and transmits various control signals including a pan/tilt operation signal and a zoom/telescope operation signal to the imaging apparatus 1. Moreover, the communication unit 24 receives the image data (the second image data) transmitted from the imaging apparatus 1.

Operation of Operation Terminal 20

Figure 4:
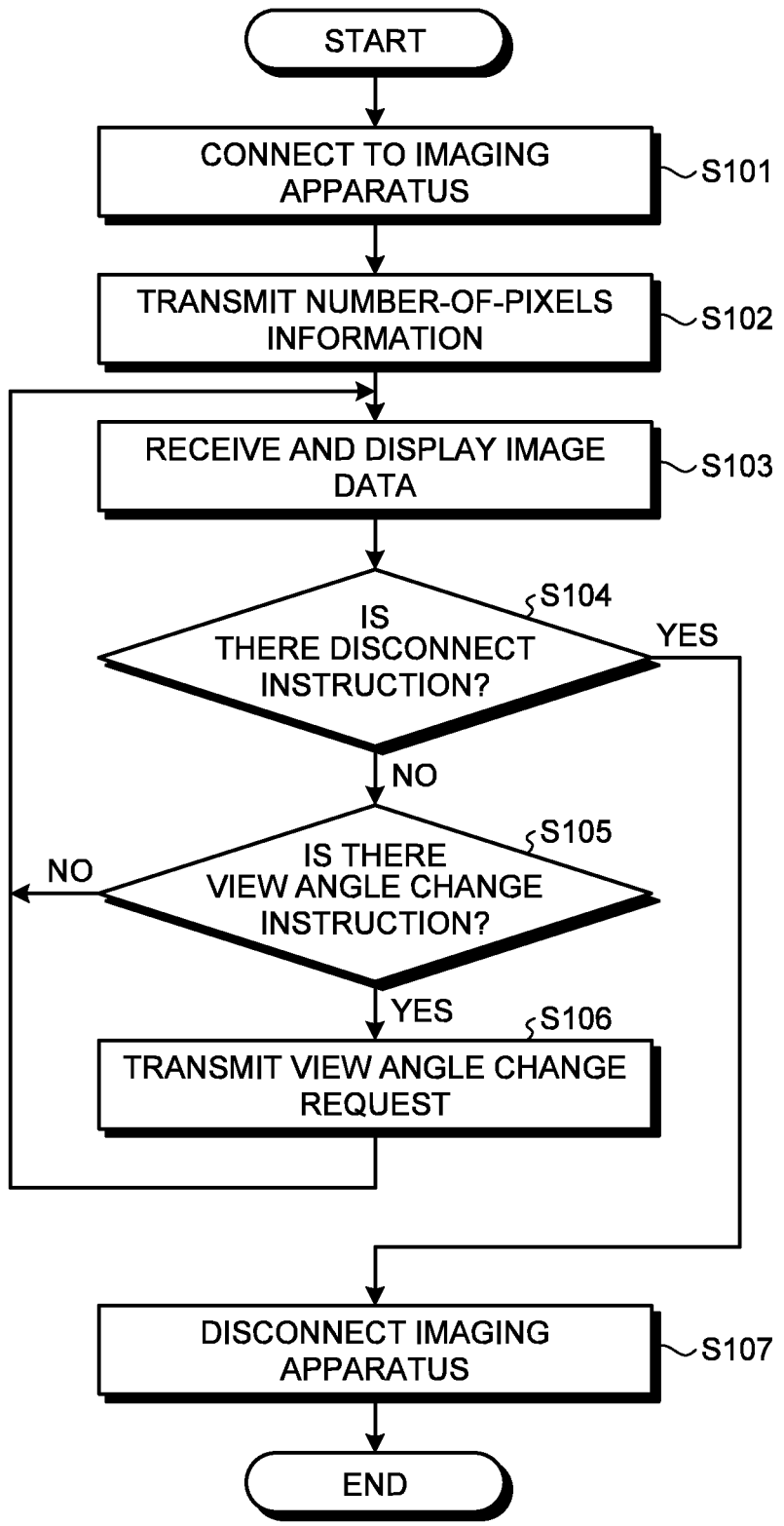
FIG. 4 is a flowchart illustrating the operations of the operation terminal according to the embodiment.

Next, a description will be given of an operation example of the operation terminal 20 with reference to FIG. 4. First, the user performs an operation of connecting the operation terminal 20 with the imaging apparatus using the operation unit 22. The control unit 23 generates a connection request signal in accordance with the operation of the operation unit 22. The communication unit 24 then transmits the connection request signal to the imaging apparatus 1 via the wireless communication path. Consequently, the operation terminal 20 and the imaging apparatus 1 are connected (Step S101).

When the connection between the operation terminal 20 and the imaging apparatus 1 is established, the control unit 23 causes the communication unit 24 to transmit the number-of-pixels information of the display unit 21 (Step S102). Consequently, the imaging apparatus 1 recognizes the number of pixels (the image size) of the display unit 21 of the operation terminal 20.

Next, the communication unit 24 receives the image data (the second image data) transmitted from the imaging apparatus 1. The control unit 23 causes the display unit 21 to display the image data received by the communication unit 24 (Step S103). Consequently, an image corresponding to an area of part of the image data (the first image data) generated by the imaging process of the imaging apparatus 1 is displayed on the display unit 21.

At this point, the control unit 23 determines whether or not the user has performed an instruction to break the connection with the imaging apparatus 1 (Step S104). The instruction to break the connection means, for example, a press of the image capture end (recording stop) button, the operation of a power off button, or the like. When the disconnect instruction has been given (Step S104: Yes), the control unit 23 breaks the connection between the imaging apparatus 1 and the operation terminal 20 (Step S107). Consequently, the operation of the imaging apparatus 1 using the operation terminal 20 ends.

On the other hand, if the user does not give the disconnect instruction (Step S104: No), the control unit 23 determines whether or not the user has given an instruction to change the angle of view (Step S105). In other words, the control unit 23 determines whether or not the user has given an instruction to change the angle of view of the image displayed on the display unit 21 (the operation of pan, zoom or the like), using the operation unit 22.

If the user has not given the instruction to change the angle of view of the display image (Step S105: No), the control unit 23 returns to the operation of Step S103. In other words, the display unit 21 continues displaying the image received from the imaging apparatus 1.

If the user has given the instruction to change the angle of view of the display image (Step S105: Yes), the control unit 23 generates a view angle change request signal and outputs it to the communication unit 24. The communication unit 24 then transmits the view angle change request signal to the imaging apparatus 1 via the wireless communication path (Step S106). When the view angle change request signal is transmitted by the communication unit 24, the display unit 21 continues displaying the image received from the imaging apparatus 1 (Step S103).

The view angle change request signals mean a pan operation signal, a tilt operation signal, a zoom operation signal, and a telescope operation signal. Moreover, the view angle change request signals also include information indicating the amount of change in angle of view indicating how much the angle of view is changed (e.g., the target value of a pan angle, the amount of pan/tilt, and zoom magnification). The amount of change in angle of view is determined, for example, in accordance with the amount of operation of the operation unit 22. For example, if a pan operation is instructed, the amount of change in angle of view is determined in accordance with a time to press the pan operation button, the distance of a swipe on a touchscreen, or the like.

Operation of Imaging Apparatus 1

Figure 5:
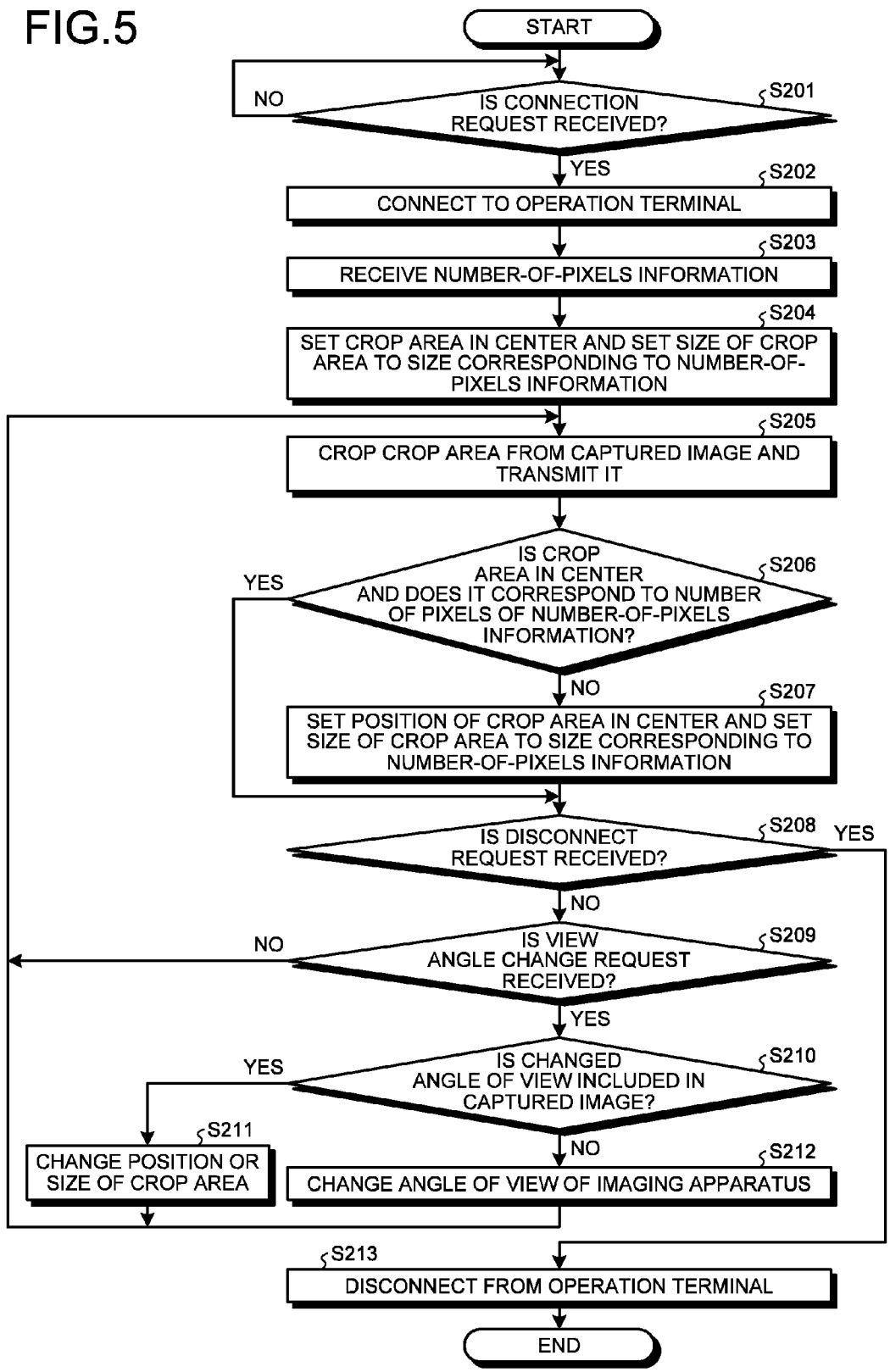
FIG. 5 is a flowchart illustrating the operations of the imaging apparatus according to the embodiment.

Next, a description will be given of an operation example of the imaging apparatus 1 according to the embodiment, using the flowchart illustrated in FIG. 5. First, the central control unit 400 of the imaging apparatus 1 determines whether or not the wireless module 309 has received the connection request signal from the operation terminal 20 (Step S201). If the wireless module 309 has not received the connection request signal (Step S201: No), the imaging apparatus 1 stands by until receiving the connection request signal. The imaging apparatus 1 may start the imaging process before receiving the connection request signal, or may start the imaging process after receiving the connection request signal.

If the wireless module 309 has received the connection request signal from the operation terminal 20 (Step S201: Yes), the imaging apparatus 1 and the operation terminal 20 are connected (Step S202). In other words, the imaging apparatus 1 comes into a state where the transmission of image data and the reception of the view angle change request signal from the operation terminal 20 are possible via the wireless communication path.

When the imaging apparatus 1 and the operation terminal 20 are connected, the wireless module 309 receives the number-of-pixels information from the operation terminal 20 (Step S203). The received number-of-pixels information is stored, for example, in the ROM 203.

As an initial setting, the image cropping unit 401 sets a central area as a crop area among the captured image data (the first image data) generated by the imaging unit 100. Moreover, the image cropping unit 401 sets the number of pixels (the image size) of the image data to be cropped based on the number-of-pixels information received from the operation terminal 20 (Step S204).

For example, if data of 1920×1080 pixels is received as the number-of-pixels information of the operation terminal 20, the image cropping unit 401 sets the position of an area of an image to be cropped to ensure the center of the captured image data coincides with the center of the image data to be cropped. The image cropping unit 401 then sets the number of pixels of the crop area to 1920×1080 pixels.

Next, the image cropping unit 401 crops the image data included in the crop area set based on the number-of-pixels information, and transmits the cropped image data to the operation terminal 20 (Step S205).

Here, the area state detection unit 402 detects the position and number of pixels of the crop area in the captured image data. The area state detection unit 402 then outputs the detection result to the view angle control unit 403.

The view angle control unit 403 determines based on the inputted detection result whether or not the area to be cropped by the image cropping unit 401 is located in the center of the captured image and the number of pixels corresponds to the number-of-pixels information (that is, the number-of pixels of the display image of the display unit 21) (Step S206). In other words, the view angle control unit 403 determines whether or not the center coordinates of the captured image data coincides with the center coordinates of the image data of the crop area. Moreover, the view angle control unit 403 determines whether or not the number of pixels of the crop area coincides with the number of pixels included in the number-of-pixels information.

When the crop area is not located in the center of the image capture area, or when the number of pixels of the crop area does not correspond to the number-of-pixels information (Step S206: No), the view angle control unit 403 adjusts the angle of view of the imaging apparatus 1 to locate the crop area in the center of the captured image data and have the number of pixels corresponding to the number-of-pixels information (Step S207). In other words, the view angle control unit 403 changes the imaging direction of the imaging apparatus 1 (pan/tilt operation) to locate a subject included in the crop area in the center of the captured image, causes the imaging unit 100 to perform zoom operation such that the number of pixels of the crop area corresponds to the received number-of-pixels information, and the like. The view angle adjustment process of Step S207 does not need to be performed at a time depending on the amount of change in angle of view. The angle of view may be changed gradually every time the loop process of Steps S205 to S212 is repeated.

If the crop area is located in the center of the captured image data and the number of pixels corresponds to the number-of-pixels information (Step S206: Yes), or if the angle of view of the imaging apparatus 1 has been adjusted by the view angle control unit 403 (Step S207), the central control unit 400 determines whether to have received a disconnect request from the operation terminal (Step S208). If the imaging apparatus 1 has received a disconnect request (Step S208: Yes), the central control unit 400 breaks the connection between the imaging apparatus 1 and the operation terminal 20 (Step S213). Thus, the operation of the imaging apparatus 1 using the operation terminal 20 ends.

If the imaging apparatus 1 has not received a disconnect request (Step S208: No), the central control unit 400 determines whether or not the wireless module 309 has received a view angle change request signal (Step S209). If the wireless module 309 has not received a view angle change request signal (Step S209: No), execution returns to the transmission process of the image data in Step S205.

If the wireless module 309 has received a view angle change request signal (Step S209: Yes), the image cropping unit 401 sets a crop area after change in angle of view based on the view angle change request signal. The area state detection unit 402 detects the position of the crop area after change in angle of view. The view angle control unit 403 then determines based on the detection result of the area state detection unit 402 whether or not the crop area after change in angle of view is included in the captured image data (Step S210).

If the crop area after change in angle of view is included in the captured image data (Step S210: Yes), the image cropping unit 401 changes the crop area in accordance with the view angle change request signal (Step S211). For example, if the view angle change request signal is a pan/tilt operation signal, the image cropping unit 401 changes the position of the crop area in the captured image such that the crop area is located in a position corresponding to the pan/tilt operation signal. The position corresponding to the pan/tilt operation signal can be acquired by various methods. For example, the position corresponding to the pan/tilt operation signal may be obtained by calculating the coordinates of the crop area after change in angle of view from the target value of a pan/tilt angle and the amount of pan/tilt that are included in the pan/tilt operation signal. Moreover, the operation terminal 20 may include the coordinates of the crop area after change in angle of view in the pan/tilt operation signal. If the view angle change request signal is a zoom/telescope operation signal, the image cropping unit 401 changes the number of pixels (the image size) of the crop area in the captured image data.

If the crop area after change in angle of view is not included in the captured image data (Step S210: No), the view angle control unit 403 changes the angle of view of the imaging unit 100 (Step S212). In other words, the view angle control unit 403 drives the support unit 12 and the rotation platform 14 (refer to FIG. 1) of the imaging apparatus 1 to change the imaging direction of the imaging apparatus 1. Moreover, if image data with a wider angle of view than current captured image data is requested, the view angle control unit 403 drives the zoom lens 101 to cause the imaging unit 100 to capture image data with a wider angle of view.

If a change in crop area is made (Step S211) or a change in angle of view of the imaging apparatus 1 is made (Step S212), the image cropping unit 401 crops the changed image data and transmits it to the operation terminal 20 (Step S205).

Specific Operation Example of Imaging System

A detailed description will be given here of the operations of the imaging apparatus 1 and the operation terminal 20, using FIGS. 6 to 9. FIGS. 6 to 9 are explanatory view of shooting conditions and crop operations and views where display images displayed on the display unit 21 of the operation terminal 20 are arranged chronologically. First, a case where the imaging apparatus 1 receives a pan operation signal from the operation terminal 20 will be described with reference to FIG. 6.

Time t11 depicts an initial state immediately after the imaging apparatus 1 and the operation terminal 20 are connected. At this point, it is assumed that the imaging apparatus 1 is at a pan angle of 0° (faces the front). Moreover, a crop area R12 is located in the center of an image capture area R11. The image cropping unit 401 crops image data of the crop area R12 and transmits the cropped image data to the operation terminal 20. Hence, a center flower out of three flowers as subjects is being displayed on the display unit 21. In the examples illustrated in FIGS. 6 and 7, it is assumed that the number of pixels of the crop area R12 is the same as the number of pixels of the display image displayed on the display unit 21.

At this point, assume that the user gives an instruction of pan operation at 30° toward the right direction using the operation unit 22. A view angle change request signal is then transmitted from the operation terminal 20 to the imaging apparatus 1. The image cropping unit 401 sets the position of the crop area R12 based on the view angle change request signal. The area state detection unit 402 detects the position of the crop area R12 after change in angle of view, and outputs the detection result to the view angle control unit 403. The view angle control unit 403 determines based on the detection result whether or not the entire crop area R12 after change in angle of view is included in the image capture area R11.

Figure 6:
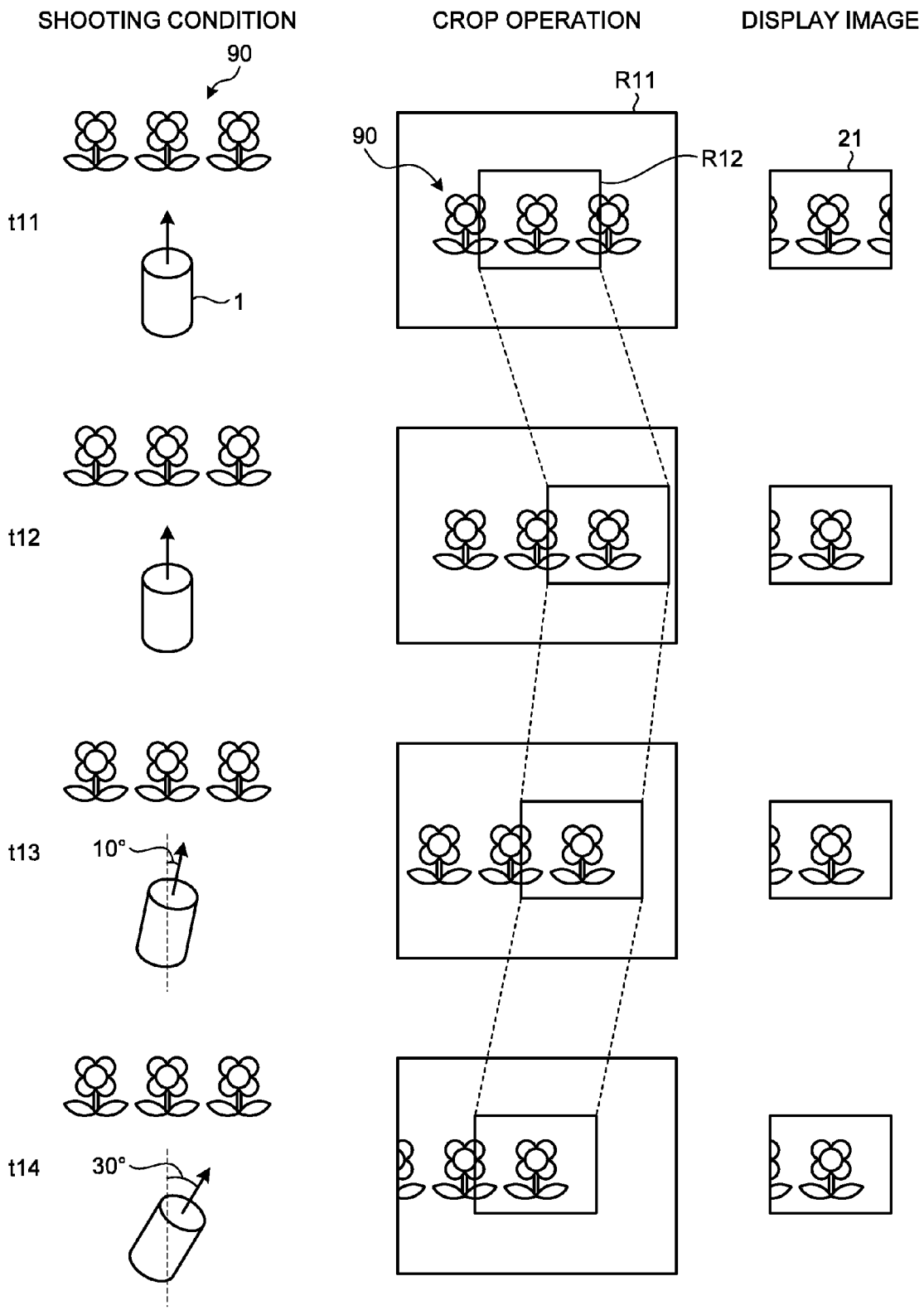
FIG. 6 is a view for explaining the operations of the imaging apparatus and the operation terminal according to the embodiment.

In the example of FIG. 6, it is assumed that the entire crop area R12 is included in the image capture area R11. Hence, at time t12, the image cropping unit 401 moves the position of the crop are R12 in the image capture area R11 to a position corresponding to the pan operation at 30°. The image cropping unit 401 then crops the crop area R12 after change in position and transmits the crop area R12 to the operation terminal 20. Therefore, at time t12, an image of the crop area R12 corresponding to the pan angle of 30° is displayed on the display unit 21. In other words, only the angle of view of the display image of the display unit 21 can be changed without changing the angle of view of the image capture area R11 of the imaging apparatus 1. In other words, the angle of view of the display image of the display unit 21 can be changed without changing the imaging direction of the imaging apparatus 1. Hence, the operation speed of change in angle of view of the display unit 21 can be improved. In addition, the number of pixels of the crop area R12 is the same as the number of pixels of the display unit 21 and, accordingly, image quality is not deteriorated, either.

Next, the view angle control unit 403 determines whether or not the crop area R12 is located in the center of the image capture area R11 based on the position of the crop area R12 detected by the area state detection unit 402. At time t12, the crop area R12 is closer to the right than the center of the image capture area R11. Hence, the view angle control unit 403 determines that the crop area R12 is not located in the center of the image capture area R11. Therefore, the image cropping unit 401 changes the position of the crop area R12 to locate the crop area R12 in the center of the image capture area R11.

Specifically, at time t13, the image cropping unit 401 moves the position of the crop area R12 toward an opposite direction (the left direction) to the pan operation (the pan instruction direction) of the imaging apparatus 1. Consequently, the position of the crop area R12 is moved little by little to the center of the image capture area R11.

On the other hand, at time t13, the view angle control unit 403 changes the angle of view of the imaging unit 100 to the pan-instructed direction (the right direction) (changes the imaging direction of the imaging unit 100). To put it another way, the view angle control unit 403 changes the imaging direction of the imaging unit 100 to an opposite direction to the movement direction of the crop area R12. It is assumed that pan angle of the imaging apparatus 1 is 10°. As a result, the position of a subject 90 included in the image capture area R11 also moves.

At this point, since the operation unit 22 is not operated, the relative position of the crop area R12 in the image capture area R11 changes, but the relative position between the subject 90 and the crop area R12 does not change. Hence, the display image displayed on the display unit 21 does not change. Such processing may be realized by changing the angle of view of the image capture area R11 and the position of the crop area R12 to opposite directions, respectively, while putting the amount of change in position with the amount of change in angle of view.

The view angle control unit 403 continues moving the position of the crop area R12 in the image capture area R11 gradually toward the center of the image capture area R11. In addition, the view angle control unit 403 changes the imaging direction to the right direction (the opposite direction to the movement direction of the crop area R12). When the pan angle of the imaging apparatus 1 reaches 30°, that is, if the pan angle of the imaging apparatus 1 reaches an angle instructed by the user, the crop area R12 returns to the central area of the image capture area R11 (time t14). Consequently, the imaging apparatus 1 can change the angle of view of a display image of the display unit 21 only by changing the position of the crop area R12 in the image capture area R11 even if the imaging apparatus 1 receives an instruction of further pan operation in the right direction.

The image cropping unit 401 crops the crop area R12 and transmits it to the operation terminal 20 even while the position of the crop area R12 in the image capture area R11 is moving toward the center. Also during the movement, the display image of the display unit 21 does not change. Hence, the subject 90 can be displayed without giving the user a sense of discomfort.

Figure 7:
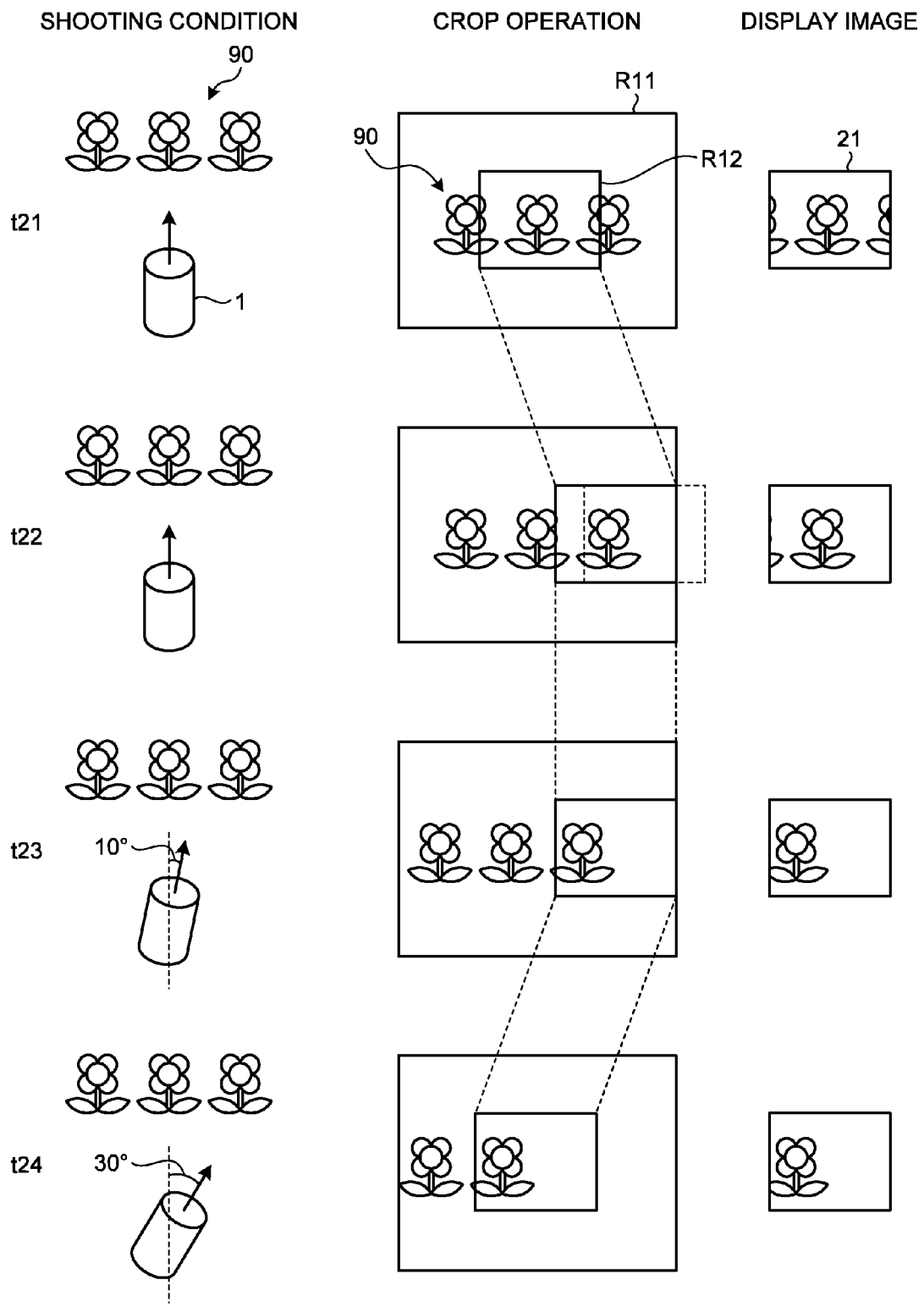
FIG. 7 is a view for explaining the operations of the imaging apparatus and the operation terminal according to the embodiment.

In the mean time, a description will be given of a case where a pan operation signal is received and the position of the crop area R12 after change in angle of view is located out of the image capture area R11, with reference to FIG. 7. A description will be omitted of an operation at time t21 since it is similar to the one at time t11 in FIG. 6. Moreover, a crop area requested by the pan operation signal is assumed to be the broken line area.

The area state detection unit 402 detects the position of the crop area R12 after change in angle of view based on the received pan operation signal. The view angle control unit 403 determines whether or not the position of the crop area R12 after change in angle of view is located out of the image capture area R11 based on the position of the crop area R12 detected by the area state detection unit 402. In the example illustrated in FIG. 7, since the position of the crop area R12 after change in angle of view (the broken line area) is located out of the image capture area R11, the view angle control unit 403 changes the angle of view of the imaging apparatus 1.

Specifically, at time t22, the image cropping unit 401 sets the crop area R12 at the end of the image capture area R11. However, a desired subject is not included in the crop area R12 only by changing the position of the crop area R12. Hence, the view angle control unit 403 changes the imaging direction of the imaging apparatus 1 without changing the position of the crop area R12 in the image capture area R11. Consequently, the position of the subject 90 included in the crop area R12 also changes. As a result, the desired subject 90 is included in the crop area R12. The image cropping unit 401 then crops the crop area R12 and transmits it to the operation terminal 20. Consequently, the desired subject 90 is displayed on the display unit 21 (time t23).

Similarly to FIG. 6, the image cropping unit 401 subsequently moves the crop area R21 to the center of the image capture area R11. In addition, the view angle control unit 403 changes the imaging direction of the imaging apparatus 1 to an opposite direction to the movement direction of the crop area R12 such that the subject 90 included in the crop area R12 is located in the center of the image capture area R11 (time t24). Tilt operation is also performed similarly to the above-mentioned pan operation.

Figure 8:
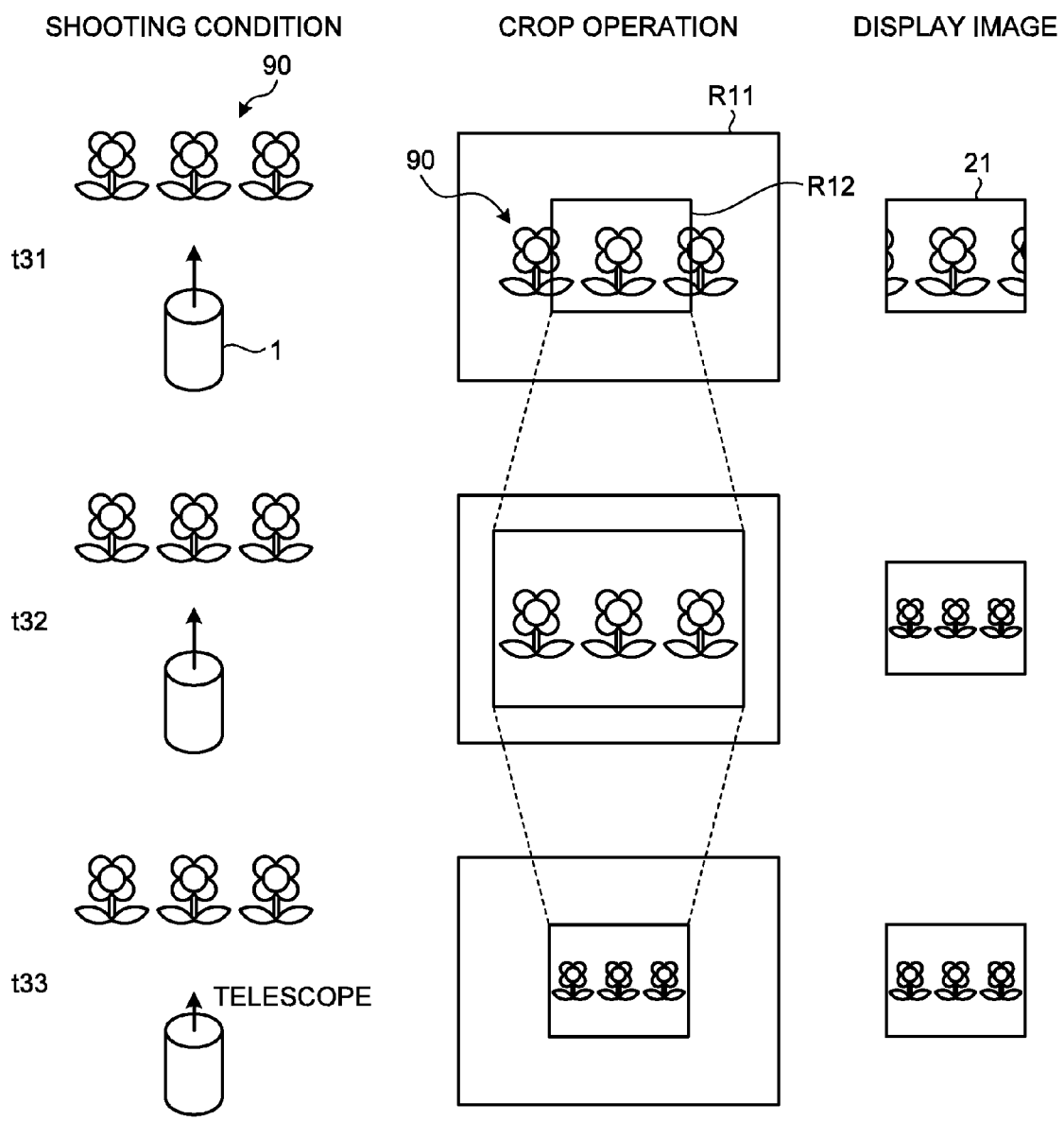
FIG. 8 is a view for explaining the operations of the imaging apparatus and the operation terminal according to the embodiment.

Next, a description will be given of a case where the user performs telescope operation using the operation unit 22 with reference to FIG. 8. Time t31 depicts an initial state immediately after the imaging apparatus 1 and the operation terminal 20 are connected. In other words, the crop area R12 is located in the center of the image capture area R11 and has the same number of pixels as the display unit 21.

It is assumed here that the user instructs the imaging apparatus 1 on telescope operation, using the operation unit 22. A view angle change request signal is then transmitted from the operation terminal 20 to the imaging apparatus 1. The image cropping unit 401 sets the enlarged crop area based on the view angle change request signal. In other words, the image cropping unit 401 increases the number of pixels (the image size) of the crop area R12. All the three flowers of the subject 90 are included in the crop area R12 after enlargement (after change in angle of view). The area state detection unit 402 detects the number of pixels of the crop area after change in angle of view. The view angle control unit 403 determines whether or not an entire crop area R14 after change in angle of view is included in the image capture area R11 based on the detection result of the area state detection unit 402. In the example of FIG. 8, it is assumed that the entire crop area R14 is included in the image capture area R11.

The image cropping unit 401 then crops the crop area R12 after enlargement of the image size and transmits the crop area R12 to the operation terminal 20. Therefore, at time t32, an image of the crop area R12 corresponding to the telescope operation is displayed on the display unit 21. In other words, only the angle of view of the display image of the display unit 21 can be changed without changing the angle of view of the imaging unit 100. Hence, the operation speed of change in angle of view of the display unit 21 can be improved.

At this point, the crop area R12 has an image size larger than an image size of the display image. In other words, the number of pixels of the crop area R12 is greater than the number of pixels of the display image. Hence, the number of pixels of the image data transmitted to the operation terminal 20 exceeds the number of pixels of the display unit 21. Therefore, the image after the telescope operation can be displayed on the display unit 21 without deterioration of image quality. If the image cropping unit 401 crops the crop area R12 having a larger image size (a greater number of pixels) than the display image, it is necessary to perform resizing where the number of pixels is decreased in order to display the image of the crop area R12 on the display unit 21. This resizing may be performed on the imaging apparatus 1 side or on the operation terminal 20 side.

Furthermore, as described above, the image data having a greater number of pixels than the display image has been cropped in the state of time t32 and, accordingly, the pixels are thinned out by resizing. In other words, the crop area R12 with higher image quality than necessary has been cropped.

Hence, the view angle control unit 403 determines whether or not the number of pixels of the crop area R12 corresponds to the number-of-pixels information. In other words, the view angle control unit 403 determines whether or not the number of pixels of the crop area R12 coincides with the number of pixels included in the number-of-pixels information based on the number of pixels detected by the area state detection unit 402. At time t32, the crop area R12 is an image having a greater number of pixels than the display image. Hence, the view angle control unit 403 determines that the number of pixels of the crop area R12 does not correspond to the number-of-pixels information. Therefore, the view angle control unit 403 changes the angle of view of the image capture area R11 such that the number of pixels of the crop area R12 coincides with the number of pixels of the number-of-pixels information.

Specifically, the view angle control unit 403 generates a control signal to execute telescope operation and commands the imaging unit 100. In other words, at time t13, the view angle control unit 403 drives the zoom lens 101 to expand the image capture range of the imaging apparatus 1 (capture a zoom out image). Consequently, the angle of view of the image capture area R11 is widened gradually.

At this point, the image cropping unit 401 reduces the image size of the crop area R12 in the image capture area R11 in accordance with changes in angle of view of the image capture area R11. In other words, the image cropping unit 401 reduces the number of pixels of the crop area R12. Consequently, the image size of the crop area R12 changes, and the image size of the subject 90 in the image capture area R11 also changes. On the other hand, the relative positions of the subject 90 and the crop area R12, and the image size do not change. Hence, the display image displayed on the display unit 21 does not change. Such processing can be realized by changing the amount of change in the angle of view of the image capture area R11 and the number of pixels of the crop area R12 together. In this manner, the number of pixels of the crop area R12 and the angle of view of the image capture area R11 are adjusted and the number of pixels of the crop area R12 is caused to coincide with the number of pixels of the display image without changing the display image. Consequently, the trouble of performing the crop and transmission of an image with higher image quality than necessary is saved and also the resizing process can be omitted. Hence, the load of the processing of the imaging apparatus 1 can be reduced.

Figure 9:
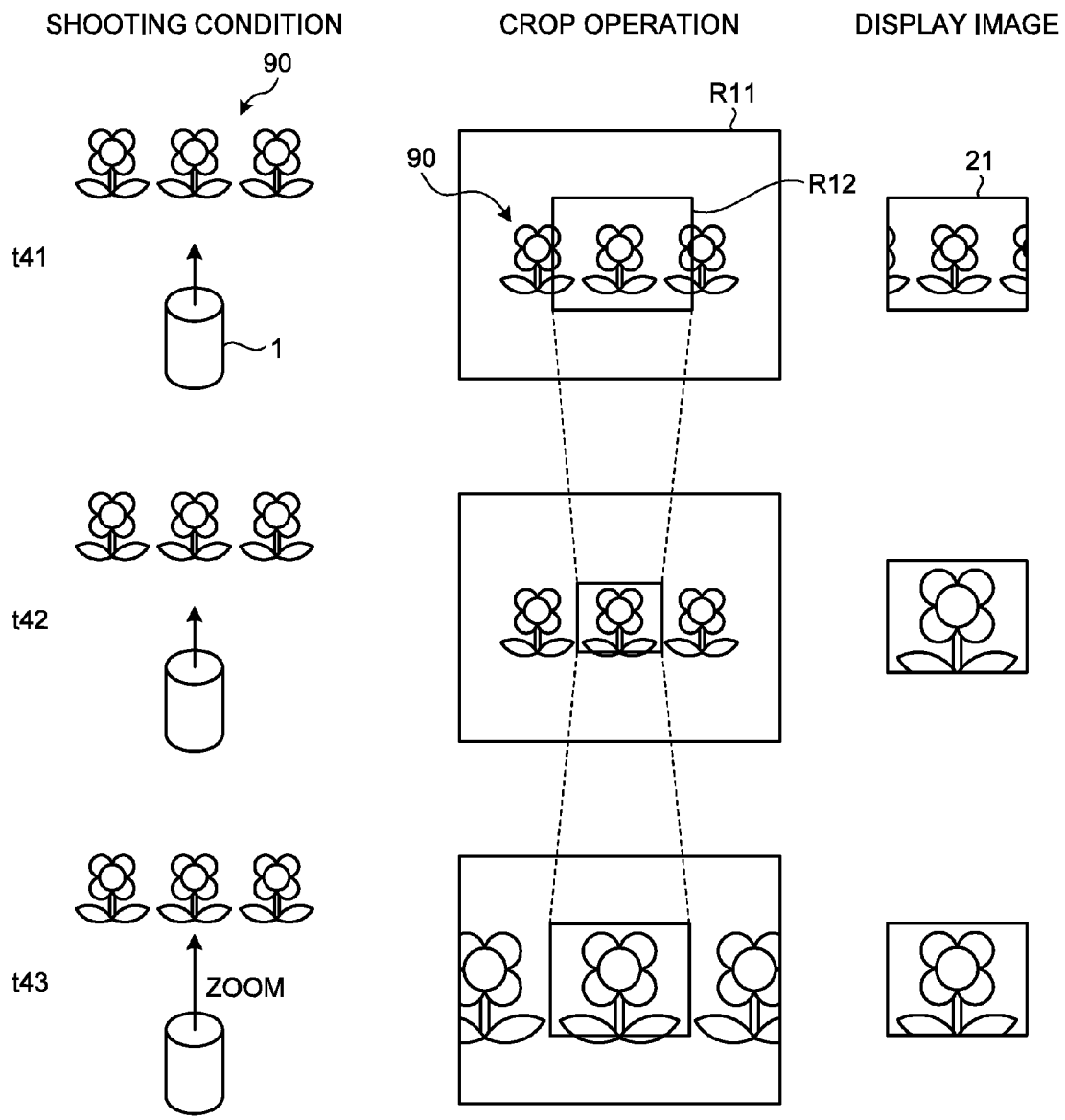
FIG. 9 is a view for explaining the operations of the imaging apparatus and the operation terminal according to the embodiment.

Next, a description will be given of a case where the user uses the operation unit 22 to perform zoom operation with reference to FIG. 9. An operation at time t41 is similar to the one at time t31 in FIG. 8 and, accordingly, the description will be omitted.

It is assumed here that the user instructs the imaging apparatus 1 a zoom operation by use of the operation unit 22. A view angle change request signal is then transmitted from the operation terminal 20 to the imaging apparatus 1. The image cropping unit 401 sets the reduced crop area based on the view angle change request signal. In other words, the image cropping unit 401 reduces the number of pixels (the image size) of the crop area R12. The crop area R12 after reduction (after change in angle of view) includes the enlarged image of the center flower of the subject 90. The area state detection unit 402 detects the number of pixels of the crop area after change in angle of view. The view angle control unit 403 determines whether or not the entire crop area R12 after change in angle of view is included in the image capture area R11 based on the detection result of the area state detection unit 402. In the example of FIG. 9, it is assumed that the entire crop area R12 is included in the image capture area R11.

The image cropping unit 401 then crops the crop area R12 after reduction in image size and transmits the crop area R12 to the operation terminal 20. Therefore, at time t42, an image of the crop area R12 corresponding to the zoom operation signal is displayed on the display unit 21. In other words, only the angle of view of the display image of the display unit 21 can be changed without changing the angle of view of the imaging unit 100. Hence, the operation speed of change in angle of view of the display unit 21 can be improved.

However, the crop area R12 at time t42 has a smaller image size than the image size of the display unit 21. In other words, the number of pixels of the display unit 21 is greater than the number of pixels of the crop area R12.

The view angle control unit 403 determines whether or not the number of pixels of a crop area R15 corresponds to the number-of-pixels information. In other words, the view angle control unit 403 determines whether or not the number of pixels of the crop area R12 coincides with the number of pixels included in the number-of-pixels information based on the number of pixels detected by the area state detection unit 402. In the example of FIG. 9, if zoom operation is performed, the number of pixels of the image data transmitted to the operation terminal 20 falls short of the number of pixels of the number-of-pixels information. Hence, the view angle control unit 403 determines at time t42 that the crop area R12 does not correspond to the number of pixels of the number-of-pixels information. Therefore, the view angle control unit 403 changes the angle of view of the image capture area R11 such that the number of pixels of the crop area R12 coincides with the number of pixels of the number-of-pixels information.

Specifically, the view angle control unit 403 generates a control signal to execute zoom operation and commands the imaging unit 100. In other words, at time t43, the view angle control unit 403 drives the zoom lens 101 to narrow down the image capture range of the imaging apparatus 1 (capture a zoom in image). Consequently, the angle of view of the image capture area R11 is narrowed down gradually.

At this point, the image cropping unit 401 expands the image size of the crop area R12 in the image capture area R11 in accordance with changes in angle of view of the image capture area R11. In other words, the image cropping unit 401 increases the number of pixels of the crop area R12. Consequently, the image size of the crop area R12 changes, and the image size of the subject 90 in the image capture area R11 also changes. On the other hand, the relative positions of the subject 90 and the crop area R12, and the image size do not change. Hence, the display image displayed on the display unit 21 does not change. Such processing can be realized by changing the amount of change in the angle of view of the image capture area R11 and the number of pixels of the crop area R12 together.

In this manner, the number of pixels of the crop area and the angle of view of the image capture area R11 are adjusted, and the number of pixels of the crop area is caused to coincide with the number of pixels of the number-of-pixels information without changing the display image. Consequently, the number of pixels of the crop area transmitted to the operation terminal 20 increases to the number of pixels of the display unit 21. Hence, it is possible to display a high quality image without wasting the display capability of the display unit 21.

As described above, with the configurations of the imaging apparatus 1 and the operation terminal 20 according to the embodiment, the operation terminal 20 transmits number-of-pixels information to the imaging apparatus 1. The image cropping unit 401 sets an area of part of captured image data as a crop area based on view angle change information and the number-of-pixels information. The image cropping unit 401 then crops image data of the crop area and transmits the image data to the operation terminal. Consequently, it is possible to change the angle of view of the display unit 21 simply by changing only the crop area without changing the angle of view of the imaging unit 100. Hence, it is possible to improve the operation speed of change in the angle of view of the display unit 21. Moreover, the image cropping unit 401 crops the image data, which has the number of pixels corresponding to the number-of-pixels information. Hence, the operation terminal 20 can receive the image data coinciding with the number of pixels of the display unit 21. Therefore, it is possible to prevent deterioration of an image displayed on the display unit 21.

Modification

A description will be given of a modification of the imaging apparatus 1 according to the embodiment. In the imaging apparatus 1 according to the modification, a distortion correction process is performed on image data cropped by the image cropping unit 401. The other configurations are similar to those of the above embodiment and, accordingly, their descriptions will be omitted as appropriate.

Specifically, based on the position of a crop area in captured image data, the digital signal processor 108 performs distortion correction on the cropped image data. The image data after distortion correction is transmitted by the wireless module 309 to the operation terminal 20.

A distorted portion may occur in the image capture area depending on the lens of the imaging apparatus 1. For example, if a fisheye lens is used, a distortion occurs with increasing distance from the center of the captured image data toward the outside. Hence, there is a difference in how a subject is viewed between a case where the subject is located in the center of the captured image data and a case where the subject is located at the end of the captured image data. Hence, if the image cropping unit 401 moves the crop area from the center to the end of the captured image data, the image data of the moved crop area distorts.

With the configuration of the imaging apparatus 1 according to the modification, the digital signal processor 108 performs distortion correction on the cropped image data based on the position of the crop area in the captured image data. For example, if the lens is a fisheye lens, the digital signal processor 108 does not perform distortion correction on the cropped image data if the crop area is located in the center of the captured image data. With increasing distance of the crop area from the center of the captured image data, the digital signal processor 108 increases the correction degree of distortion correction for the cropped image data. Consequently, the imaging apparatus 1 can transmit image data where distortion is suppressed to the operation terminal 20 regardless of the position of the subject in the captured image data. As a result, it is possible to improve the image quality of an image displayed on the display unit 21.

At this point, an enlargement process, a reduction process, or the like is performed on pixels included in the image data of the crop area depending on the process content of the distortion correction process. Hence, the cropped rectangular image data may not be rectangular after distortion correction (e.g., sides of the image data distorts). Hence, the image cropping unit 401 previously deforms the crop area (e.g., a predetermined side of the crop area is distorted outward or inward) such that the image data after distortion correction is rectangular, in accordance with the process content of the distortion correction process. The distortion correction process is then performed by the digital signal processor 108 to generate rectangular image data where distortion correction has been performed from the deformed image data. Consequently, image data to be transmitted to the operation terminal 20 always has a rectangular shape; accordingly, it is possible to improve visibility. Naturally, distortion correction may be performed on the entire captured image data before it is cropped to crop a rectangular crop area from the captured image data after distortion correction.

The present invention is not limited to the above embodiment, but can be modified and combined as appropriate within a range that does not depart from the spirit of the present invention. For example, in the above embodiment, the case where the size (the number of pixels) of image data (the second image data) cropped by the image cropping unit 401 is the same as the number of pixels of the display unit 21 is described, but the present invention is not limited to this. For example, the image cropping unit 401 may crop image data (the second image data) with a greater number of pixels than the number of pixels (the number of pixels included in number-of-pixels information) of the display unit 21. In this case, a resizing process that reduces the image size is performed on the cropped image data in the imaging apparatus 1 or in the operation terminal 20 to coincide with the number of pixels of the display unit 21.

Furthermore, as an initial setting, the image cropping unit 401 sets a central area of captured image data as a crop area immediately after connection is established between the imaging apparatus 1 and the operation terminal 20, but the present invention is not limited to this. As long as it is an area included in the captured image data, the position is not limited. However, considering subsequent pan/tilt operation, it is better to have space above, below, left and right of a crop area and, accordingly, pan/tilt operation in every direction can be realized without changing the imaging direction of the imaging apparatus 1. Hence, it is preferable that the position of a crop area of the initial setting should be the center of captured image data.

The present invention is not limited to the above embodiment, but can be modified and combined as appropriate within a range that does not depart from the spirit of the present invention. Moreover, the above processes of the imaging apparatus 1 and the operation terminal 20 can be executed by a computer program stored in a ROM of a main processor and the like. In the above example, the program including an instruction set for causing a computer (processor) to execute the processes is stored using various non-transitory computer readable media (non-transitory computer readable medium) and can be supplied to the computer. The non-transitory computer readable media include various tangible storage media (tangible storage medium). Examples of the non-transitory computer readable medium includes a magnetic recording medium (e.g., a flexible disk, a magnetic tape, or a hard disk drive), a magneto-optical recording medium (e.g., a magneto-optical disk), a CD-ROM (Read Only Memory), a CD-R, a CD-R/W, a semiconductor memory (e.g., a mask ROM, a PROM (Programmable ROM), an EPROM (Erasable PROM), a flash ROM, or a RAM (Random Access Memory)). Moreover, the program may be supplied to the computer by various transitory computer readable media (transitory computer readable medium). Examples of the transitory computer readable medium include an electrical signal, an optical signal, and an electromagnetic wave. The transitory computer readable medium can supply the program to the computer via a wired communication path such as an electric wire or an optical fiber, or a wireless communication path.

According to the present invention, it is possible to provide an imaging apparatus, an imaging method, an imaging system, and a program that can improve the speed of change in the angle of view of the display unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging apparatus comprising:
   an imaging unit that generates first image data by an imaging process;
   a receiving unit that receives view angle change information to instruct a change in angle of view on which an imaging process is performed, and number-of-pixels information related to the number of pixels of a display unit of an operation terminal;
   an image cropping unit that sets an area of part of a first image data as a crop area based on the view angle change information and the number-of-pixels information, and crops a second image data included in the crop area;
   a transmitting unit that transmits the second image data to the operation terminal,
   an area number-of-pixels detection unit that detects the number of pixels of the crop area in the first image data; and
   a view angle control unit that changes the angle of view of the imaging unit based on the number of pixels of the crop area in the first image data, wherein
   the image cropping unit reduces, when the number of pixels of the crop area is greater than the number of pixels coinciding with the number-of-pixels information, the number of pixels of the crop area in the first image data to the number of pixels coinciding with the number-of-pixels information; and the image cropping unit increases, when the number of pixels of the crop area is less than the number of pixels coinciding with the number-of-pixels information, the number of pixels of the crop area in the first image data to the number of pixels coinciding with the number-of-pixels information; and the view angle control unit optically widens, when the number of pixels of the crop area is greater than the number of pixels coinciding with the number-of-pixels information, the angle of view of the imaging unit such that the number of pixels of the crop area becomes the number of pixels based on the view angle change information; and the view angle control unit optically narrows, when the number of pixels of the crop area is less than the number of pixels coinciding with the number-of-pixels information, the angle of view of the imaging unit such that the number of pixels of the crop area becomes the number of pixels based on the view angle change information.

2. An imaging system comprising:
an imaging apparatus; and
an operation terminal that operates the imaging apparatus, wherein
the imaging apparatus and the operation terminal are connectable via a communication path,
the imaging apparatus includes
    an imaging unit that generates a first image data by an imaging process,
    a first receiving unit that receives view angle change information to instruct a change in angle of view on which an imaging process is performed, and number-of-pixels information related to the number of pixels of a display unit of the operation terminal,
    an image cropping unit that sets an area of a part of the first image data as a crop area based on the view angle change information and the number-of-pixels information, and crops a second image data included in the crop area,
    a first transmitting unit that transmits the second image data to the operation terminal,
    an area number-of-pixels detection unit that detects the number of pixels of the crop area in the first image data, and
    a view angle control unit that changes the angle of view of the imaging unit based on the number of pixels of the crop area in the first image data, wherein
    the image cropping unit reduces, when the number of pixels of the crop area is greater than the number of pixels coinciding with the number-of-pixels information, the number of pixels of the crop area in the first image data to the number of pixels coinciding with the number-of-pixels information; and the image cropping unit increases, when the number of pixels of the crop area is less than the number of pixels coinciding with the number-of-pixels information, the number of pixels of the crop area in the first image data to the number of pixels coinciding with the number-of-pixels information; and
    the view angle control unit optically widens, when the number of pixels of the crop area is greater than the number of pixels coinciding with the number-of-pixels information, the angle of view of the imaging unit such that the number of pixels of the crop area becomes the number of pixels based on the view angle change information; and the view angle control unit optically narrows, when the number of pixels of the crop area is less than the number of pixels coinciding with the number-of-pixels information, the angle of view of the imaging unit such that the number of pixels of the crop area becomes the number of pixels based on the view angle change information; and the operation terminal includes
    an operation unit,
    a view angle change information generation unit that generates the view angle change information based on operation of the operation unit,
    a second receiving unit that receives the second image data,
    a display unit that displays the second image data thereon, and
    a second transmitting unit that transmits the view angle change information and the number-of-pixels information of the display unit to the imaging apparatus.

3. An imaging method comprising:
generating a first image data by an imaging process;
receiving view angle change information to instruct a change in angle of view on which an imaging process is performed, and number-of-pixels information related to the number of pixels of a display unit of an operation terminal;
when the number of pixels of an area that is instructed with the view angle change information is greater than the number of pixels coinciding with the number-of-pixels information,
    setting to reduce the number of pixels of a crop area in the first image data to the number of pixels coinciding with the number-of-pixels information, and setting to optically widen the angle of view such that the number of pixels of the crop area becomes the number of pixels based on the view angle change information;
when the number of pixels of an area that is instructed with the view angle change information is less than the number of pixels coinciding with the number-of-pixels information,
    setting to increase the number of pixels of a crop area in the first image data to the number of pixels coinciding with the number-of-pixels information, and setting to optically narrow the angle of view such that the number of pixels of the crop area becomes the number of pixels based on the view angle change information;
cropping a second image data included in the crop area; and
transmitting the second image data to the operation terminal.

4. A computer program product comprising a non-transitory computer usable medium having computer readable program causing a computer to execute:
generating a first image data by an imaging process;
receiving view angle change information to instruct a change in angle of view on which an imaging process is performed, and number-of-pixels information related to the number of pixels of a display unit of an operation terminal;
when the number of pixels of an area that is instructed with the view angle change information is greater than the number of pixels coinciding with the number-of-pixels information,
    setting to reduce the number of pixels of a crop area in the first image data to the number of pixels coinciding with the number-of-pixels information, and setting to optically widen the angle of view such that the number of pixels of the crop area becomes the number of pixels based on the view angle change information;
when the number of pixels of an area that is instructed with the view angle change information is less than the number of pixels coinciding with the number-of-pixels information, setting to increase the number of pixels of a crop area in the first image data to the number of pixels coinciding with the number-of-pixels information, and setting to optically narrow the angle of view such that the number of pixels of the crop area becomes the number of pixels based on the view angle change information;
cropping a second image data included in the crop area; and
transmitting the second image data to the operation terminal.

\* \* \* \* \*